(No Model.)

D. McCAUSLAND.
SELF DROPPING CHECK ROWER AND MARKING ATTACHMENT FOR CORN PLANTERS.

No. 264,729. Patented Sept. 19, 1882.

WITNESSES:
C. Neveux
C. Sedgwick

INVENTOR:
D. McCausland
BY Munn & Co.
ATTORNEYS.

United States Patent Office.

DAVID McCAUSLAND, OF MARSHALLTOWN, IOWA.

SELF-DROPPING CHECK-ROWER AND MARKING ATTACHMENT FOR CORN-PLANTERS.

SPECIFICATION forming part of Letters Patent No. 264,729, dated September 19, 1882.

Application filed February 21, 1882. (No model.)

*To all whom it may concern:*

Be it known that I, DAVID MCCAUSLAND, of Marshalltown, Marshall county, Iowa, have invented a new and useful Improvement in Self-Dropping Check-Rowers and Marker Attachments for Corn-Planters, of which the following is a full, clear, and exact description.

Reference is to be had to the accompanying drawings, forming part of this specification, in which similar letters of reference indicate corresponding parts in both figures.

Figure 1:
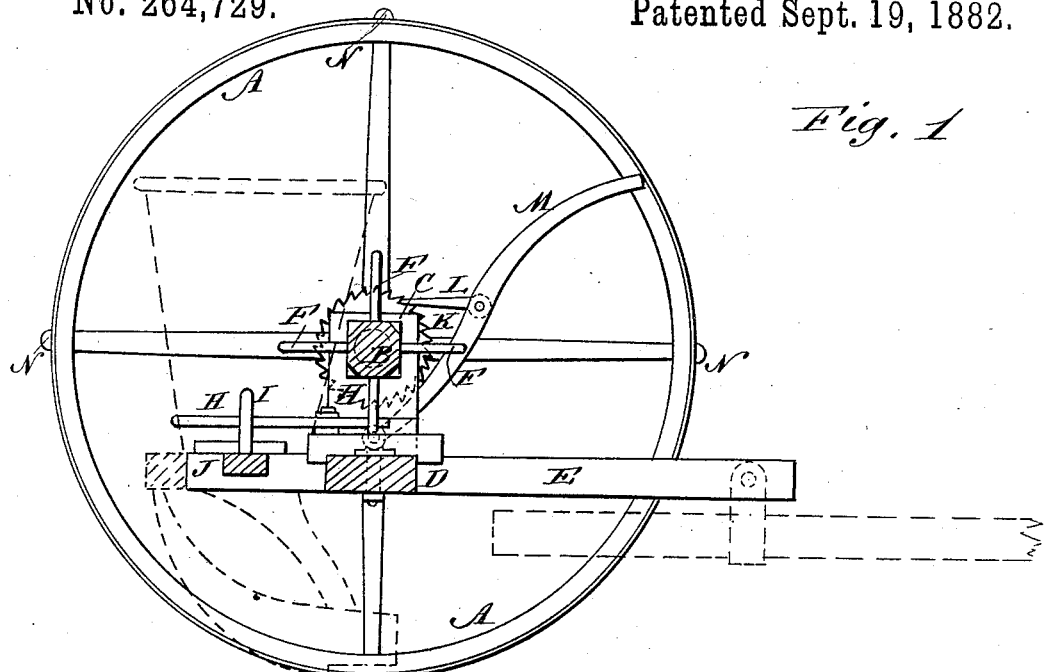
Figure 2:
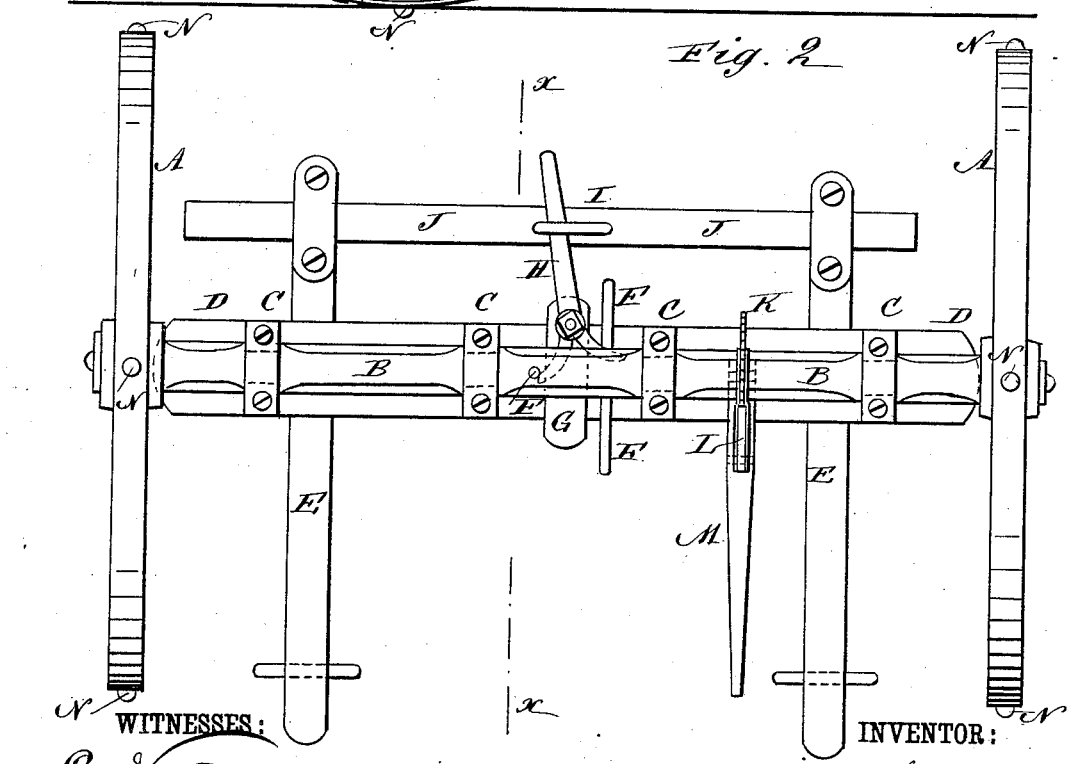

Figure 1 is a sectional side elevation of my improvement, taken through the line $xx$, Fig. 2; and Fig. 2 is a plan view of the same.

The object of this invention is to facilitate the dropping of corn in accurate check-rows.

The invention consists in a novel construction and arrangement of parts, as hereinafter described and claimed.

A represents the drive-wheels, the axle B of which revolves in bearings in the upper ends of short standards C, attached to the cross-bar D, placed beneath and parallel with the axle B.

To the cross-bar D, at a little distance from its ends, are attached two longitudinal bars, E, the rear ends of which are designed to be hinged to the frame of a planter by means of eye-straps or by other suitable means.

To the axle B, at a little distance apart and at right angles with each other, are attached two pins, F, which project upon the opposite sides of the said axle B to such a distance as to reach nearly to the cross-bar D.

To the cross-bar D, between the pins F, is attached a bar, G, the forward end of which projects, and to it is pivoted the lever H. The rear part of the lever H is forked, and its branches are inclined or curved outward, so as to be struck successively by the pins F as the axle B revolves, so that the lever H will be vibrated by the advance of the machine. The forward part of the lever H passes through a keeper, I, attached to the seed-dropping slide J of the planter, so that the seed will be dropped by the vibration of the lever H.

To the axle B is attached a ratchet-wheel, K, with the teeth of which engages the pawl L. The pawl L is hinged to a lever, M, the lower end of which is hinged to the cross-bar D, so that the axle B can be turned, by operating the lever M, to adjust the machine at the ends of the rows, or when necessary to cause the hills to be dropped in line with the cross-rows of hills previously planted, so that the planting will be done in accurate check-row.

To the rims of the wheels A are attached knobs N in such positions as to mark the ground in line with the hills to serve as a guide in adjusting the machine. With this construction the wheels A and their attachments can move up and down independent of the planter, so that the seed will be dropped regularly, whether the ground be even or uneven.

I am aware that a seed-slide has heretofore been vibrated by means of tappets and cams, and I therefore lay no claim, broadly, to such construction, my invention being confined to the precise construction and arrangement of parts as pointed out in the claim.

Having thus described my invention, I claim as new and desire to secure by Letters Patent—

In a planter, the combination, with wheels A, the rotary axle B, provided with the pins F, and the seed-slide J, provided with the keeper I, of the longitudinal side bar, E, the cross-bar D, parallel with the axle and carrying the short bar G, and the standards C, in which the axle revolves, and the forked lever H, having its branches curved or inclined outward and extending beneath the axle, between the pins of the same, substantially as and for the purpose set forth.

DAVID McCAUSLAND.

Witnesses:
J. M. WHITAKER,
J. CHINSTRAND.